United States Patent
Chidichimo et al.

(10) Patent No.: US 6,850,862 B1
(45) Date of Patent: Feb. 1, 2005

(54) METHODS AND EQUIPMENT FOR THE MEASUREMENT OF THE THREE-DIMENSIONAL DISTRIBUTION OF THE TEMPERATURES WITHIN DIELECTRIC MEANS

(75) Inventors: Giuseppe Chidichimo, Arcavacata di Rende (IT); Yuri Tkachenko, Niznj Novgorod (RU); Alexei Ovechkin, Niznj Novgorod (RU); Lev Pasmanik, Niznj Novgorod (RU); Arkadya Troitsky, Niznj Novgorod (RU); Igor Ylianichev, Niznj Novgorod (RU); Margarita Golovanova, Niznj Novgorod (RU); Yaroslav Sergeyev, Rende (IT)

(73) Assignee: Meta Instruments Srl, Rende (IT)

( * ) Notice: Subject to any disclaimer, the term of this patent is extended or adjusted under 35 U.S.C. 154(b) by 0 days.

(21) Appl. No.: 09/869,006

(22) PCT Filed: Oct. 23, 2000

(86) PCT No.: PCT/IT00/00426
§ 371 (c)(1),
(2), (4) Date: Oct. 5, 2001

(87) PCT Pub. No.: WO01/29527
PCT Pub. Date: Apr. 26, 2001

(30) Foreign Application Priority Data

Oct. 22, 1999 (IT) .......................................... CZ99A0010

(51) Int. Cl.[7] .......................... G01K 7/00; G06K 15/00

(52) U.S. Cl. ........................ 702/130; 702/134; 702/135; 600/310; 356/51

(58) Field of Search ................................. 600/316, 310; 356/51; 702/130, 132, 134, 135

(56) References Cited

U.S. PATENT DOCUMENTS 5,119,819 A * 6/1992 Thomas et al. ............. 600/438
6,574,490 B2 * 6/2003 Abbink et al. .............. 600/316

OTHER PUBLICATIONS

Yoshinori, Hamamura et al., "Non–invasive measurement of temperature –versus –depth profile in biological systems using a multiple frequency–band microwave radiometer system", Automedica, 1987 vol. 8, pp. 213–232.*

* cited by examiner

Primary Examiner—Kamini Shah
(74) Attorney, Agent, or Firm—Synnestvedt & Lechner LLP

(57) ABSTRACT

A method and an apparatus for generating three-dimensional maps of temperature distribution throughout a dielectric object is disclosed. The apparatus uses radiometric sensors to detect radiation from various layers within the object over a range of wavelengths from radio waves through the infrared. The radiation emissions are linked to temperatures through the use of Planck's Radiation Law, and a three-dimensional map of the temperature distribution is generated using Fridgolm intergrals. The device and method has application for early detection of cancer and is non-invasive.

13 Claims, 2 Drawing Sheets

METHODS AND EQUIPMENT FOR THE MEASUREMENT OF THE THREE-DIMENSIONAL DISTRIBUTION OF THE TEMPERATURES WITHIN DIELECTRIC MEANS

FIELD OF THE INVENTION

A new type of tomograph has been invented that is able to map the three-dimensional distribution of temperatures present within dielectric objects, including biological objects. Although the instrument may be used in all fields, one of its most important uses is in the medical-diagnostic field, considering that it may allow a three-dimensional thermal map of human internal organs to be defined.

BACKGROUND OF THE INVENTION

The present invention concerns an instrument and a methodology for the determination of a three-dimensional distribution of the temperatures of dielectric objects, non invasively. It is based on the possibility of measuring, with extreme precision, the electromagnetic heat emission that results from objects with temperatures above absolute zero. All bodies that have such temperature distributions radiate electromagnetic radiation in accordance with the law of Planck: from a physical point of view there is thus a certain quantity of internal heat that is radiated externally as electromagnetic radiation. The power emitted depends principally on the temperature of the body and on its emission properties. The electromagnetic wave emission power of the objects can be described as not very elevated frequencies (until the infrared zone) through Rayleigh-Jeans type equations and it proves to be directly proportional to:

the square of the frequency;
the emission coefficient, between zero and one, that in turn depends on the frequency,
the body temperature; and
the Boltzman constant.

The emission power however, at room temperature, reaches a maximum in the infrared zone, but decreases, exactly as the square of the frequency, for lower frequencies. Because of this, the detection of the power irradiated by the object in the millimeter, centimeter and meter wavelengths, becomes a much more critical problem and requires extremely sensitive sensors. Surveys that are able to precisely measure the objects' emission power, in this frequency range, have become accessible in the last years. The first surveys in this frequency field were the Dicke radiometers. However, even these sensors have not been greatly used because of the measurement errors introduced principally by the reflection of the radiating power emitted by the objects on the level of the interface between the objects and the sensor's antenna. There have been various attempts to correct this undesired effect. An initial solution to the problem was presented by Ludeke et al. in 1978. More recently, more effective solutions were presented by Troitskii and Raldin, and Holodilov and Ulianichev. The latest generation of sensors, commonly defined as radiothermometers now allows one to measure, with extreme precision, the physical temperature of dielectric objects without errors caused by the reflection of the power that radiates towards the interface between the object and the sensor antenna. In the radiothermometer proposed by the inventors, the antenna is connected through a modulator of the first arm of a circulator. The second arm of this circulator is connected to the input of the radiometer. The radiometer has within itself a reference high tension generator that feeds the modulator. In this case, a resistance, in thermal contact with the temperature transducer, is a noise generator. The output of the resistance is connected both to the output of the radiometer, through a high frequency de-coupling element (inductor), and to the third arm of the circulator through a fitting capacitor. The radiometer stops feeding the resistance when its temperature is identical to the object's temperature.

Ultimately, the problem of detecting electromagnetic emission in the wave length field that goes from millimeters to meters can be considered solved, and the present invention, that will use as electromagnetic radiation sensors the aforementioned radiometers, benefits from this.

The instrument of the present invention requires the extension of the frequencies detectable until the infrared zone. This proves comprehensible if one considers that the penetration power of the electromagnetic waves in the dielectric objects is directly proportional to the wave lengths of the radiation, which in turn inversely depends on the square root of the dielectric constant of the intersected object. When it is desired to map the internal temperature distribution of a determinate object, it is therefore necessary to have at one's disposal detectors that are sensitive to an ample range of frequencies so that measuring the power irradiated in increasing wave lengths, starting from the infrared, deeper and deeper layers of the investigated object are gradually characterized. The necessity of extending the frequency field to the infrared is not a problem because the availability of the infrared sensors is much broader. Even if the instrument of the present invention is useable in all fields in which one wishes to determine the three-dimensional distribution of the temperature within any dielectric object, a particularly important application is the generation of three-dimensional thermal maps in human internal organs, and from this point of view, the instrument is of great interest for medical diagnostics.

In order to illustrate the effect of the invention on the medical diagnostic sphere, and the considerable innovation level, its use will be referred to as Radiomammography, and the instrument will be referred to as a Radiomamograph, that is, an apparatus that is able to produce three dimensional thermal maps of internal sections of the breast. This internal organ is particularly exposed to tumor pathology attacks. Breast cancer is one of the main problems of modern oncology. At the moment, the most used diagnostic method for detection of a breast tumor is X-ray mammography, which has been seriously analyzed, both in its use limitations and its diagnostic criteria. It is a universally recognized fact by this time that x-ray application in mammography currently in use represents an important factor of tumor pathology induction. In 1997, the World Health Organization identified mammography as the third risk factor for breast cancer. Hence, many important world health organizations, such as the Department of Health and Human Services (USA) and the National Cancer Institute (USA) urge the scientific world to develop new methods for the early diagnosis of breast cancer.

For some years now, the possibility of applying, to the detection of breast tumors, techniques such as MRI (Magnetic Resonance Imaging) and PET (Position Emission Tomography) has been investigated. These techniques, however, subject the analyzed organs to strong electromagnetic fields whose effects on the cells are not completely known. Besides, these methodologies, because of their expensiveness and the various limitations that they encounter, cannot be used for population prevention screening.

The mammography technique, in addition to the inconvenience represented by its intrinsic invasiveness and riskiness, presents still another important limiting factor; its low spatial resolution on soft tissues. In the case of breast cancer, its is very difficult to detect tumors whose size is smaller than two centimeters that generally have behind them already a long incubation period.

The present invention proposes, among other things, the solution of the problem of early detection of breast cancer through the application of an investigation method that is able to discover the presence of a tumor in its initial development phase. In particular, the present invention concerns a method and its related instruments for the generation of three-dimensional thermal maps that allow the identification of inflammation centers of tumor masses within tissues even weakly radiating (tenth of degrees). Explicitly referring to the identification of tumor pathologies, it is known that the tumor tissue differs from healthy tissue for a series of biochemical parameters. The tumor cells present a low accumulation efficiency of the metabolic energy that is dispersed thermally, giving rise to a temperature increase of the tumor mass as compared with that of the healthy tissues. It is furthermore acknowledged that any local inflammation is linked to more or less localized temperature increases.

SUMMARY OF THE INVENTION

The instrument is made up of:

1. Electromagnetic wave emission sensors that are able to detect radiation with wavelengths that go from the millimeter, centimeter, and meter wavelengths to those of the infrared.
2. All structural elements and the mechanical and electronic accessories necessary to assemble and move the aforesaid sensors, so as that the sensors themselves can detect most suitably the heat emissions of the dielectric objects, according to given directions and distances.
3. An electronic co-ordinator for the automatic management of the instruments.
4. Software for machine management and for the mapping of the three-dimensional distributions of the temperatures in the dielectric objects.

DETAILED DESCRIPTION OF PREFERRED EMBODIMENTS

The methodology that is proposed concerns the non invasive determination of the three-dimensional distribution of temperature within dielectric objects, including biological tissues and organs. This methodology uses sensors that are able to measure the heat radiating power emitted by the objects at different frequencies, within a range that goes from radio waves (wavelength one meter) to infrared waves (wave length one micron). The reception apparatus of such sensors is directed in space according to appropriate specifications that will depend on the geometry and dielectric characteristics of the analyzed object. Given that the effective layer thickness that contributes to electromagnetic emission depends on the wave length of the monitored radiation, it will be possible to generate the three-dimensional distribution of the temperatures within the analyzed volume, that is, the value of the corresponding temperatures at small values (pixels) within the total analyzed volume, measuring the power radiated at different frequencies by placing the sensor antenna in correspondence with a chosen set of points on the surface of the object that circumscribes the investigated volume.

Beginning from the thermal data measured at various frequencies and from various surface points, the generation of the three-dimensional thermal maps of the investigated objects will be obtained through the application of appropriate algorithms that will naturally take into consideration the topological data of the problem. The best approach for the solution of the problem of the generation of the thermal field according to point values, initiating from integral data of the radiated power, is based on the use of the Rayleigh-Jeans equation, that describes the connection between the emission spectral density and the kinetic temperature of the elements of the object. On the other hand, the generation algorithms of the three-dimensional thermal distribution may be based on models in which the link between the emission intensities and the temperature profiles are expressed through first order Fridgolm integrals.

The instruments, proposed in the present invention, will allow the measurement of the total emissions of electromagnetic waves at various wave lengths, in the range between infrared and radio waves, and through various observation directions.

It will therefore contain a series of sensors that are able to measure electromagnetic waves in specific spectral bands. Such sensors are mounted on supports that are adjustable and removable in space so that the various sensors can be positioned in such a way as to measure the emissions along directions that have been pre-established by the observer, with the object for which the three dimensional temperature distribution is to be determined remaining fixed. The movement of the sensors may occur both automatically and manually.

Figure 2:
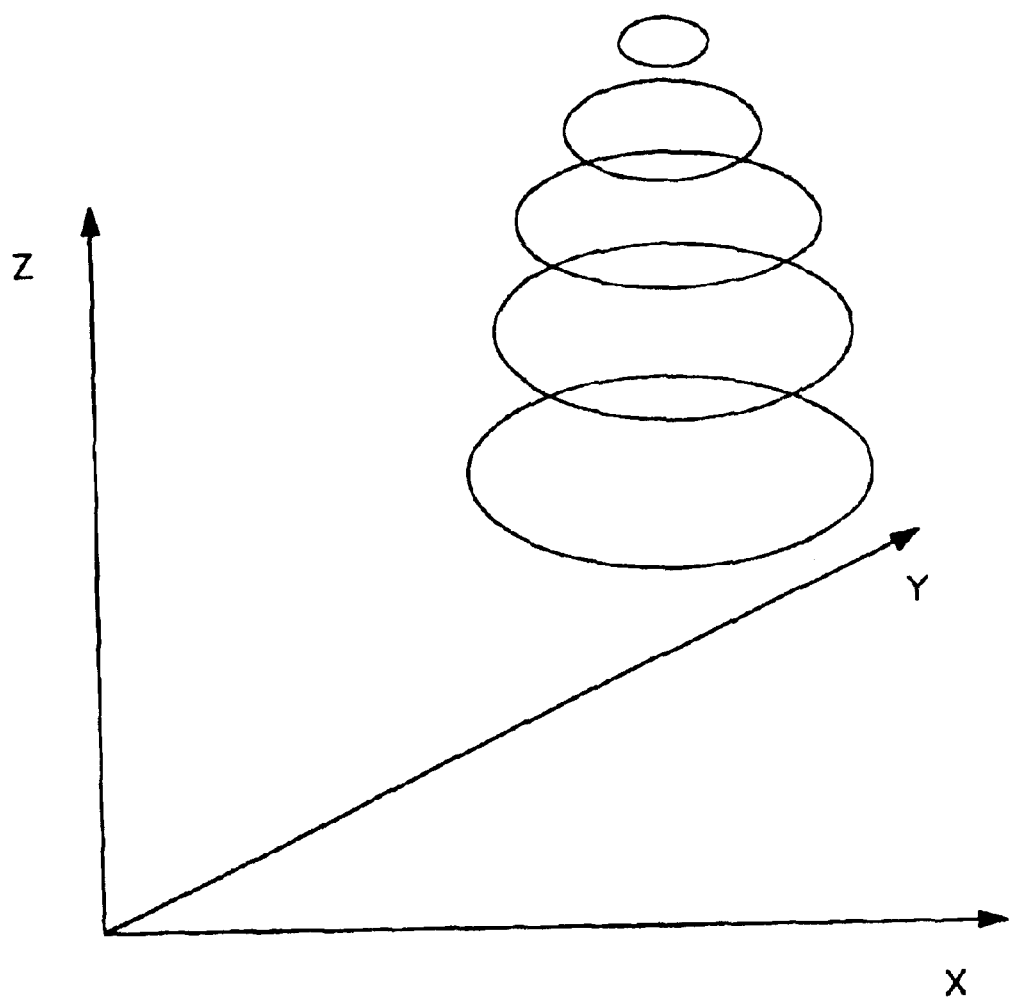
FIG. 2 is a map of a three dimensional temperature distribution within a dielectric object as generated by the apparatus and method according to the invention.

The data measured by the sensors are sent through appropriate interfaces to a data recording system that is able to re-elaborate the experimental information (total emission of electromagnetic waves of the object at various wave lengths and through various directions and/or distances), resolving integral equations with Fridgolm type methods, setting as output, the three-dimensional map of the temperatures of the object, as shown in FIG. 2. Such a map, in addition to being supplied as a table, can be presented on a screen or also printed as a thermal image.

Figure 1:
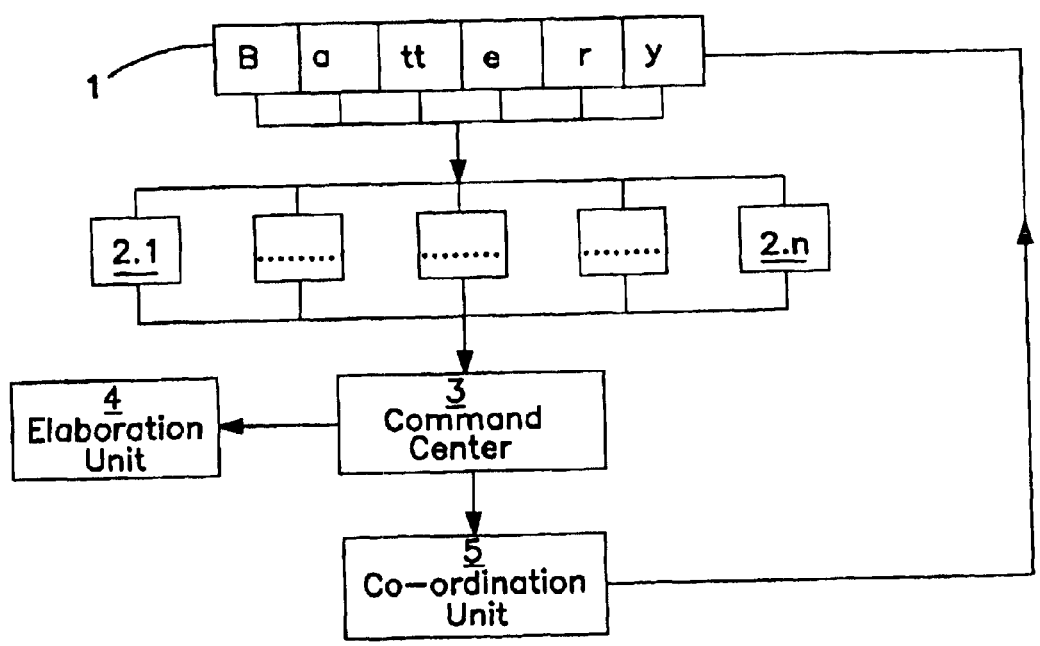
FIG. 1 is a schematic diagram depicting the apparatus according to the invention.

A schematic diagram of the proposed instrument is shown in FIG. 1. The sensor battery (1) may be oriented on the basis of a program that the operator can control during the analysis. For example, the operator, on the basis of the observations, at certain wavelengths representative of the surface thermal distribution, can determine topological parameters for the sensor movement, operating at gradually increasing wavelengths, to better define the heat determinations of the deeper layers of the object. The output of the different frequency channels 2.1 . . . 2n will be charged in command center 3, that contains, in its interior, the elaboration unit 4 and co-ordination unit (5) of the entire instrument.

What is claimed is:

1. Instrument for non invasive measurement of a three-dimensional distribution of temperatures of dielectric objects, with the inclusion of human organs or other biological tissues, the instrument comprising sensors to determine the electromagnetic heat emission power data in a frequency range between radio wave radiation and infrared radiation, said sensors being mounted on supports, said supports being adjustable and movable in space, said sensors being positionable along pre-established directions to determine said three dimensional distribution of temperature, said instrument including a data storage and calculation system having an interface with said sensors, said electromagnetic heat emission power data measured by said sensors being sent through said interface to said data storage and calculation system, said data storage and calculation system producing as output a three-dimensional map of said temperature distribution.

2. Instrument for non invasive measurement according to claim 1 wherein the map is in the form of a table.

3. Instrument for non invasive measurement according to claim 1 wherein the map is displayed on a screen.

4. Instrument for non invasive measurement according to claim 1 wherein the map is in the form of a thermal map.

5. A non invasive method of measuring three-dimensional distribution of temperature of dielectric objects using an instrument of the type according to claim 1 comprising the steps of reconstructing point temperatures using Rayleigh-Jeans equations, and expressing said temperature distribution through Fridgolm integrals, said three dimensional temperature distribution being based upon models linking emission intensities and said temperature distribution through said Fridgolm integrals.

6. A non invasive measurement method according to claim 5 further comprising the step of recording thermometric data automatically.

7. A non invasive measurement method according to claim 5 further comprising the step of using said three dimensional temperature distribution for medical-diagnostic purposes, on human internal organs.

8. A non invasive measurement method according to claim 5 further comprising the step of manually determining topological parameters for sensor handling working on gradually increasing or decreasing wave lengths.

9. A non invasive measurement method according to claim 5 further comprising the step of handling the sensors automatically and according to the pre-established programs, that can be chosen by the operator.

10. A non invasive method of measuring three-dimensional distribution of temperature of dielectric objects using an instrument of the type according to claim 2 comprising the steps of reconstructing point temperatures equations, and expressing said temperature distribution through Fridgolm integrals, said three dimensional temperature distribution being based upon models linking emission intensities and said temperature distribution through said Fridgolm integrals.

11. A non invasive method of measuring three-dimensional distribution of temperature of dielectric objects using an instrument of the type according to claim 3 comprising the steps of reconstructing point temperatures using Rayleigh-Jeans equations, and expressing said temperature distribution through Fridgolm integrals, said three dimensional temperature distribution being based upon models linking emission intensities and said temperature distribution through said Fridgolm integrals.

12. A non invasive method of measuring three-dimensional distribution of temperature of dielectric objects using an instrument of the type according to claim 4 comprising the steps of reconstructing point temperatures using Rayleigh-Jeans equations, and expressing said temperature distribution through Fridgolm integrals, said three dimensional temperature distribution being based upon models linking emission intensities and said temperature distribution through said Fridgolm integrals.

13. Instrument for non invasive measurement of a three-dimensional distribution of temperatures of dielectric objects, the instrument comprising sensors to determine the electromagnetic heat emission power data in a frequency range between radio wave radiation and infrared radiation, said sensors being mounted on supports, said supports being adjustable and movable in space, said sensors being positionable along pre-established directions to determine said three dimensional distribution of temperature, said instrument including a data storage and calculation system having an interface with said sensors, said electromagnetic heat emission power data measured by said sensors being sent through said interface to said data storage and calculation system, said data storage and calculation system producing as output a three-dimensional map of said temperature distribution.

* * * * *